United States Patent
Lee (10) Patent No.: US 10,860,561 B2
(45) Date of Patent: Dec. 8, 2020

(54) METHOD AND APPARATUS FOR PROVIDING EFFICIENT INDEXING AND COMPUTER PROGRAM INCLUDED IN COMPUTER READABLE MEDIUM THEREFOR

(71) Applicant: TmaxData Co., Ltd., Gyeonggi-do (KR)

(72) Inventor: Joo Hyun Lee, Gyeonggi-do (KR)

(73) Assignee: TmaxData Co., Ltd., Gyeonggi-do (KR)

(*) Notice: Subject to any disclaimer, the term of this patent is extended or adjusted under 35 U.S.C. 154(b) by 245 days.

(21) Appl. No.: 16/019,694

(22) Filed: Jun. 27, 2018

(65) Prior Publication Data
US 2019/0362000 A1    Nov. 28, 2019

(30) Foreign Application Priority Data
May 25, 2018   (KR) .................. 10-2018-0059336

(51) Int. Cl.
*G06F 16/00* (2019.01)
*G06F 16/22* (2019.01)
(Continued)

(52) U.S. Cl.
CPC ...... *G06F 16/2246* (2019.01); *G06F 11/3003* (2013.01); *G06F 16/2237* (2019.01); *G06F 16/23* (2019.01)

(58) Field of Classification Search
CPC ............. G06F 16/2246; G06F 16/2264; G06F 16/901; G06F 16/223; G06F 16/216;
(Continued)

(56) References Cited

U.S. PATENT DOCUMENTS 5,903,888 A    5/1999  Cohen et al.
6,278,992 B1   8/2001  Curtis et al.
(Continued)

FOREIGN PATENT DOCUMENTS

JP    2004-326404 A    11/2004

OTHER PUBLICATIONS

Office Action from the Korean Patent Office, dated Jun. 17, 2019 (5 pages).
(Continued)

*Primary Examiner* — Anh Ly
(74) *Attorney, Agent, or Firm* — Brian B. Shaw, Esq.; Harter Secrest & Emery LLP (57) ABSTRACT

Disclosed is a method performed by a database management system (DBMS) according to an exemplary embodiment of the present disclosure. The method may create a database index structure for pointing a data storage location based on monitoring result information depending on a monitoring algorithm in the database management system. The database index structure may at least partially include a sub index structure of a first level and a sub index structure of a second level which is lower than the first level, the second level sub index structure may include a plurality of columns, a first column among the plurality of columns of the second level sub index structure may include key values, a second column among the plurality of columns of the second level sub index structure may include ROWID values corresponding to rows of a data block, and a third column among the plurality of columns of the second level sub index structure may include optimized index values set based on the monitoring result information.

9 Claims, 5 Drawing Sheets

(51) Int. Cl.
 *G06F 11/30* (2006.01)
 *G06F 16/23* (2019.01)
(58) Field of Classification Search
 CPC .. G06F 16/23; G06F 16/2237; G06F 11/3003;
 G06F 16/2228; G06F 6/00; G06F 16/22;
 G06F 11/30; G06F 16/284; G06F 16/00;
 G06F 16/2455; G06F 17/30; G06F
 17/30598; G06F 17/30321; G06F
 17/30327; G06F 17/30477; G06F
 17/30336; G06F 17/00
 See application file for complete search history.

(56) References Cited

U.S. PATENT DOCUMENTS

| | | | | |
|---|---|---|---|---|
| 8,982,129 | B1* | 3/2015 | Broekhuijsen | G06F 16/9024 345/440 |
| 9,097,239 | B2* | 8/2015 | Heidenreich | F03D 15/00 |
| 2002/0093522 | A1* | 7/2002 | Koskas | G06F 16/284 715/700 |
| 2007/0177512 | A1* | 8/2007 | Alexander | H04L 45/12 370/238 |
| 2008/0114787 | A1* | 5/2008 | Kashiyama | G06F 16/2272 |
| 2013/0151535 | A1* | 6/2013 | Dusberger | G06F 16/2272 707/747 |
| 2014/0122173 | A1* | 5/2014 | Wang | G06Q 30/0202 705/7.31 |
| 2015/0186453 | A1* | 7/2015 | Agarwal | G06F 16/2246 707/781 |
| 2015/0186500 | A1* | 7/2015 | Rope | G06Q 10/10 707/798 |
| 2015/0186529 | A1* | 7/2015 | Rope | G06Q 10/00 707/722 |
| 2016/0246828 | A1* | 8/2016 | Cho | G06F 16/24575 |

OTHER PUBLICATIONS http://www.dbguide.net/db.db?cmd=view&boardUid=13856&boardConfigUid=9&categoryUid=216&boardldx=80&boardStep=1 accessed Mar. 17, 2015 (6 pages).

* cited by examiner

METHOD AND APPARATUS FOR PROVIDING EFFICIENT INDEXING AND COMPUTER PROGRAM INCLUDED IN COMPUTER READABLE MEDIUM THEREFOR

CROSS-REFERENCE TO RELATED APPLICATIONS

This application claims priority to and the benefit of Korean Patent Application No. 10-2018-0059336 filed in the Korean Intellectual Property Office on May 25, 2018, the entire contents of which are incorporated herein by reference.

TECHNICAL FIELD

The present disclosure relates to a database indexing technique, and more particularly, to an index creating technique for enhancing DB performance.

BACKGROUND ART

Businesses of enterprises are rapidly expanding with explosive data growth and the emergence of diverse environments and platforms. As new business environments emerge, more efficient and flexible data services and information processing, and data management functions are needed. In response to these changes, a research is continued on databases to solve problems of high performance, high availability, and scalability which are foundations of corporate business implementation.

In a database management system (DBMS), data may be stored in a data storage. In a relational database management system (RDBMS), the data storage may be referred to as a table. The table may include one or more rows and each of one or more rows may include one or more columns.

When the database includes a large amount of data, it may take a relatively long time to perform a query to retrieve data in which a user is interested. When it takes a long time for the database to respond to the query, it may adversely affect performance of the database. Accordingly, in the art, various techniques are researched for reducing a time required for processing of responding to a query, that is, for increasing the performance of the database management system.

In order to increase a data retrieval speed from the database, an indexing technique can be utilized. The index can refer to a data structure that increases an operation speed for the table in a database field. When the index is used, not only a time required for data retrieval can be reduced, but also the amount of resources consumed in the data retrieval can be reduced.

In general, the index structure consists of a tree structure. The tree structure as a kind of graph is constituted by a node and a pointer indicating the node. Multiple nodes may not indicate one node and one node may indicate multiple nodes. When a large quantity of stored data need to be searched, a scheme that compares the data one by one is inefficient. When the data are stored in an arrangement state through indexing using the tree structure, the data may be efficiently retrieved. A traverse means a series of processes of searching the index. The traverse is performed by a process of finding a next pointer by comparing a value of a search target and a division value by starting from a root node. When an index corresponding to the value of the search target is discovered through the traverse, the traverse ends.

The index can be largely classified into a B+ tree (balanced Tree) index and a bitmap index.

The B+ tree index may refer to a hierarchical index scheme into a root block, a branch block, and a leaf block. In the B+ tree index, the leaf block has a ROWID that can access the corresponding row of a data block, and the branch block and the root block have a key value (e.g., an address value of the block) to access each lower level.

A bitmap index may refer to an index technique that stores a column value by using a bit which is the minimum unit used in a computer and automatically generates the ROWID by using the stored column value.

Each of the B+ tree indexing scheme and the bitmap indexing scheme may have advantages and disadvantages due to structural characteristics thereof. Therefore, there is a need in the art for an efficient indexing technique to enhance the performance of the DBMS in a context of processing a large amount of data.

SUMMARY OF THE INVENTION

The present disclosure has been made in an effort to shorten a query processing time in a DBMS in order to satisfy a demand in the art.

The present disclosure has been made in an effort to provide an efficient indexing technique in the DBMS in order to satisfy the demand in the art.

An exemplary embodiment of the present disclosure provides a computer program stored in a computer readable storage medium including encoded commands, which is configured to cause one or more processors to perform the following operations in order to enhance retrieval performance of data when the computer program is executed by the one or more processors of a computer system, in which the operation may include: an operation of creating a database index structure for pointing a data storage location based on monitoring result information depending on a monitoring algorithm in a database management system (DBMS). The database index structure may at least partially include a sub index structure of a first level and a sub index structure of a second level which is lower than the first level, the second level sub index structure may include a plurality of columns, a first column among the plurality of columns of the second level sub index structure may include key values, a second column among the plurality of columns of the second level sub index structure may include ROWID values corresponding to rows of a data block, and a third column among the plurality of columns of the second level sub index structure may include optimized index values set based on the monitoring result information.

Another exemplary embodiment of the present disclosure provides a method performed by a database management system (DBMS). The method may include creating a database index structure for pointing a data storage location based on monitoring result information depending on a monitoring algorithm in the database management system. The database index structure may at least partially include a sub index structure of a first level and a sub index structure of a second level which is lower than the first level, the second level sub index structure may include a plurality of columns, a first column among the plurality of columns of the second level sub index structure may include key values, a second column among the plurality of columns of the second level sub index structure may include ROWID values corresponding to rows of a data block, and a third column among the plurality of columns of the second level sub index structure may include optimized index values set based on the monitoring result information.

Yet another exemplary embodiment of the present disclosure provides a database management apparatus. The database management apparatus may include a processor creating a database index structure for pointing a data storage location based on monitoring result information depending on a monitoring algorithm in the database management system (DBMS); and a storage unit storing the created database index structure. The database index structure may at least partially include a sub index structure of a first level and a sub index structure of a second level which is lower than the first level, the second level sub index structure may include a plurality of columns, a first column among the plurality of columns of the second level sub index structure may include key values, a second column among the plurality of columns of the second level sub index structure may include ROWID values corresponding to rows of a data block, and a third column among the plurality of columns of the second level sub index structure may include optimized index values set based on the monitoring result information.

According to exemplary embodiments of the present disclosure, a query processing time in a DBMS can be shortened.

According to exemplary embodiments of the present disclosure, an efficient indexing technique in the DBMS can be provided.

BRIEF DESCRIPTION OF THE DRAWINGS

Various aspects are now described with reference to the drawings and like reference numerals are generally used to designate like elements. In the following embodiments, for a purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

DETAILED DESCRIPTION

Various embodiments and/or aspects will be now disclosed with reference to drawings. In the following description, for the purpose of a description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof.

Further various aspects and features will be presented by a system which can include multiple devices, components, and/or modules. It should also be appreciated and recognized that various systems can include additional apparatuses, components, and/or modules and/or that the various systems cannot include all of apparatuses, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, and the software.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A or the case where X uses B, and the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that the singular form generally means "one or more" in the present specification and the claims.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer readable media having various data structures, which are stored therein. The components may perform communication with another system through local and/or remote processing according to a signal (for example, data from one component that interacts with other components and/or data through a network such as the Internet through a signal in a local system and a distribution system) having one or more data packets, for example.

The computer readable medium in the present specification may include all kinds of storage media storing programs and data so as to be readable by the computer system. According to an aspect of the present disclosure, the computer readable media in the present disclosure may include both computer readable storage media and computer readable transmission media. The computer readable storage media may include a read only memory (ROM), a random access memory (RAM), a compact disk (CD)-ROM, a digital video disk (DVD)-ROM, a magnetic tape, a floppy disk, an optical data storage device, and the like. The computer readable transmission media may include a medium which is implemented in a type of a carrier wave (e.g., transmissions through the Internet). Additionally, the media are distributed to systems connected through network to store computer readable codes and/or commands in a distribution scheme.

Prior to describing detailed contents for carrying out the present disclosure, it should be noted that configurations not directly associated with the technical gist of the present disclosure are omitted without departing from the technical gist of the present disclosure. Further, terms or words used in the present specification and claims should be interpreted as meanings and concepts which match the technical spirit of the present disclosure based on a principle in which the inventor can define appropriate concepts of the terms in order to describe his/her invention by a best method.

A basic concept of an indexing technique according to an exemplary embodiment of the present disclosure is discussed in detail in U.S. Pat. No. 9,626,398 (Apr. 4, 2017) and US2007-0174309 (Jul. 26, 2007), the entirety of which is incorporated by reference herein.

As described above, the index may be divided into a B+ tree index and a bitmap index.

The B+ tree index may refer to a hierarchical index scheme into a root block, a branch block, and a leaf block. In the B+ tree index, the leaf block has a ROWID that can access the corresponding row of a data block, and the branch block and the root block have a key value (e.g., an address value of the block) to access each lower level.

Since the B+ tree index has a structure in which table column values and ROWIDs of information in an aggregate are arranged in an aligned form, when physical addresses are different from each other for the same value, the physical addresses need to duplicatively have the same value, and as a result, a storage space may be wasted. In other words, the B+ tree index may have a disadvantage in managing and processing large amounts of data because actual column values need to be stored even in an index. Further, in order to efficiently operate the B+ tree index, not only selectivity of the column values needs to be excellent but also there is a disadvantage that performance of the index is not guaranteed under certain conditions. Furthermore, the B+ tree index may be subject to many constraints in a situation where two or more indexes are used in parallel for accessing the same table. Requirements of users in a real DBMS business environment can be very diverse. In order to satisfy the requirements of various types of users, the B+ tree index corresponding to a combination of all the columns of the table needs to be created and in such a case, a strange phenomenon may be caused, in which an index size may be larger than the table size. When there are two B+ tree indexes with good distribution, there may also be constraints for effectively using two indexes in simultaneously using two or more indexes like a case where only one index is used.

As an attempt to solve problems of the B+ tree index, the bitmap index may be considered. The bitmap index may refer to an index technique that stores a column value by using a bit which is the minimum unit used in a computer and automatically generates the ROWID by using the stored column value. In general, the bitmap index may be generated in a scheme in which a table scan is performed in order to find values of a column in which the index is to be generated and thereafter, an index entry having a column value, start ROWID, and end ROWID, and a bitmap is generated and generated bitmaps are arranged in a form (that is, a key value and a start ROWID order) to be easily inserted into a B+ tree structure and thereafter, the arranged index entries are inserted into the B+ tree structure. However, even in the case of the bitmap index, the bitmap entries are continually increased during a data manipulation language (DML) operation, and frequent DML operations may result in bitmap indexes being larger than the size of the table. Further, the size of the bitmap index may inefficiently increase when there are a lot of distinct values.

According to an exemplary embodiment of the present disclosure, a technique for combining the bitmap index and the B+ tree index in an efficient manner may be provided. The technique may include expressing a leaf node having a low frequency based on a frequency for the leaf node in a B+ tree scheme and expressing a lead node having a high frequency by adding a bitmap value to the B+ tree scheme. Further, the technique may include a technique that expresses the index in the B+ tree scheme with respect to a case where the distinct value is more than a predetermined value or a partition in which the number of occurrence times of the DML is more than a predetermined number of times and expresses the index by adding the bitmap value to the B+ tree scheme with respect to a partition in which the distinct value is smaller than the predetermined number or the occurrence of the DML is small than the predetermined number of times.

According to an exemplary embodiment of the present disclosure, not only the size of the index may be minimized, but also the query processing performance of the DBMS may be increased. According to an exemplary embodiment of the present disclosure, an efficient indexing technique may be provided, which is optimized to redeeming conditions in a DB system as well as the query processing time in the DBMS may be reduced.

Figure 1:
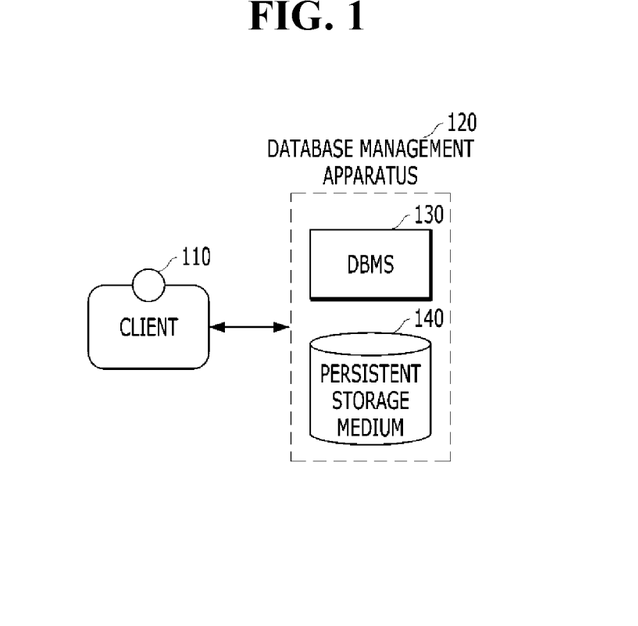
FIG. 1 is a schematic view of a database management apparatus and a client according to an exemplary embodiment of the present disclosure.

FIG. 1 is a schematic view of a database management system 120 and a client 110 according to an exemplary embodiment of the present disclosure.

As illustrated in FIG. 1, the database system may include the client 110 and the database management apparatus 120. The database management apparatus in the present specification may be used interchangeably with a database server.

As illustrated in FIG. 1, the client 110 may mean a node(s) in a database system having a mechanism for communication through a network. For example, the client 110 may include a predetermined electronic device having connectivity with a personal computer (PC), a laptop computer, a workstation, a terminal, and/or the network. Further, the client 110 may include a predetermined server implemented by at least one of agent, application programming interface (API), and plug-in. For example, the client 110 in FIG. 1 may be associated with a user using the database management apparatus 120. In such an example, the client 110 may issue to the database management apparatus 120 various types of queries including the DML and a data definition language (DDL).

The database management apparatus 120 may include a predetermined type of computer system or computer device such as a microprocessor, a mainframe computer, a digital single processor, a portable device, and a device controller. For example, the database management apparatus 120 according to an exemplary embodiment of the present disclosure may include a database server. The database management apparatus 120 may include a database management system (DBMS) 130 and a persistent storage 140. In FIG. 1, one database management apparatus is illustrated, but it will be apparent to those skilled in the art that database management apparatuses therethan may also be included in the scope of the present disclosure.

Although not illustrated in FIG. 1, the database management apparatus 120 may include one or more memories including a buffer cache. Further, although not illustrated in FIG. 1, the database management apparatus 120 may include one or more processors. Therefore, the DBMS 130 may be operated by the processor on the memory.

Herein, the memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by a processor. The memory may temporarily store a data table and/or an index table including a data value. The data table and the index table may include the data value and in the exemplary embodiment of the present disclosure, the data value of the tables may be written in the persistent storage from the memory. In an additional aspect, the memory may include the buffer cache and data may be stored in a data block of the buffer cache. The data may be written in the persistent storage by a background process.

The persistent storage 140 means a non-volatile storage medium which may consistently store predetermined data, such as a magnetic disk, an optical disk, and a magneto-optical storage device and a storage device based on a flash memory and/or a battery-backup memory. The persistent storage 140 may communicate with the processor and the memory of the database management apparatus 120 through various communication means. In an additional exemplary embodiment, the persistent storage 140 is positioned outside the database management apparatus 120 to communicate with the database management apparatus 120. According to an exemplary embodiment of the present disclosure, the persistent storage medium 140 and the memory may be collectively called a storage unit.

The DBMS 130 as a program for permitting the database management apparatus 120 to perform predetermined types of operations of the database including retrieval, insertion, modification, and/or deletion of required data, and generating the index and accessing the index may be implemented by the processor in the memory of the database management apparatus 120 as described above.

The client 110 and the database management apparatus 120 or the database management apparatuses may also communicate with each other through the network (not illustrated). The network according to the exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. Additionally, the network may include a database link (dblink), and as a result, a plurality of database management apparatuses communicates with each other through the database link to fetch data from another database management apparatus. The techniques described in the present specification may be used in other networks in addition to the aforementioned networks.

Figure 2:
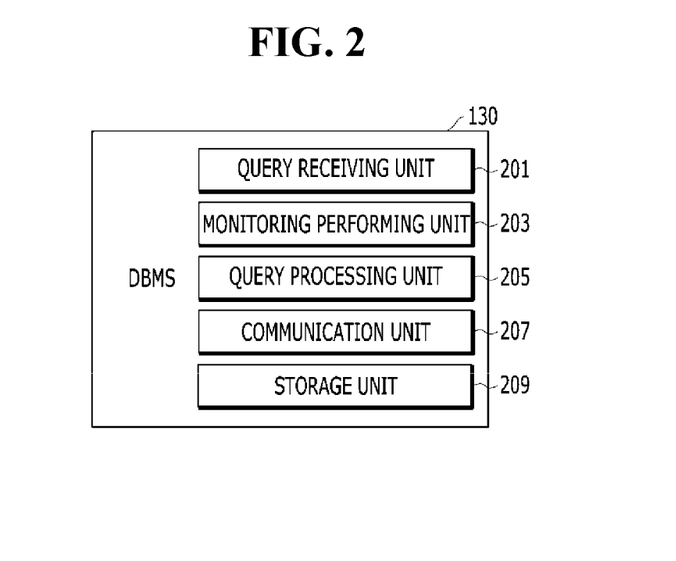
FIG. 2 is a block diagram of a DBMS according to an exemplary embodiment of the present disclosure.

FIG. 2 is a block diagram of a DBMS 130 according to an exemplary embodiment of the present disclosure.

As illustrated in FIG. 2, the DBMS 130 may include a query receiving unit 201, a monitoring performing unit 203, a query processing unit 205, a communication unit 207, and a storage unit 209. The components illustrated in FIG. 2 are exemplary and some of the components may be omitted or additional components may be added according to an implementation aspect of the present disclosure. The components in the DBMS 130 may be executed by one or more processors and stored in the memory and/or the persistent storage medium 140. The memory and the permanent storage medium 140 described above may be integrated into the storage unit 209. In this case, the storage unit 209 communicates with the processor to control data storage/management.

The query receiving unit 201 may control the reception of an arbitrary type of query issued from the client 110. The query receiving unit 201 may perform a specific operation on the received query. The query in the present disclosure may include a data manipulation language (DML) including querying, updating, adding, changing, deleting, and inserting data. For example, the DML may include commands related to SELECT, INSERT, UPDATE, and DELETE. Further, the query in the present disclosure may include a data definition language (DDL) used when defining, changing, or removing a schema, a domain, a table, a view, and an index. The DDL may include commands such as CREATE, ALTER, DROP, RENAME, and TRUNCATE. As an example of the DDL, a query for creation of a database index structure may be included.

After the processor parses, transforms, and optimizes the query through the DBMS 130, the query may be executed in the form of an optimized query statement. Additionally, when the query receiving unit 201 receives the query, a plurality of (candidate) execution algorithms for the reception of the query may be automatically determined or the plurality of (candidate) execution algorithms for the reception of the query may be determined based on a hint received from the client. As an example related to data querying, an execution algorithm may be decided regarding whether the data querying is to be performed through the index or the data querying is to be performed through a full table scan.

In one aspect of the present disclosure, the query related to the creation of the database index structure may include, for example, CREATE INDEX, CREATE INDEX WITH DROP_EXISTING, ALTER INDEX REBUILD, ALTER TABLE ADD CONSTRAINT (PRIMARY KEY or UNIQUE), ALTER TABLE DROP CONSTRAINT (PRIMARY KEY or UNIQUE), and DROP INDEX MOVE TO, and the like, but is not limited thereto.

The monitoring performing unit 203 may perform a monitoring operation that may be a basis for creating the database index structure. The monitoring operation in the present specification may mean a process of acquiring at least one information of, for building the index, count/frequency information of access to a specific key value, count/frequency information of access to specific data, a distinct value information for a specific partition, count/frequency information of occurrence of the DML for the specific partition, and last access time information of data included in the specific partition. The count/frequency information may refer to a counting value or a value of the number of times per hour. The time information may refer to actual time information or may refer to time information (e.g., Tibero sequence number (TSN)) autonomously managed by the database management apparatus 120.

The monitoring performing unit 203 may generate monitoring result information according to monitoring execution. The monitoring execution result information may include an indication indicating which indexing scheme of a first type indexing scheme and a second type indexing scheme different from the first type indexing scheme a specific sub index structure (e.g., a subordinate sub index structure) among a plurality of sub index structures included in the database index structure is to use. In an exemplary embodiment of the present disclosure, a specific type indexing scheme may include an arbitrary indexing scheme. For example, the first type indexing scheme may include a bitmap indexing scheme. The second type indexing scheme may include a B+ tree indexing scheme. In addition, the monitoring result information may indicate which indexing scheme is to be used in units of ROWID and/or partition in which a database table is divided.

According to the aforementioned examples, for example, the monitoring result information may include an indication that a specific row of the leaf node uses the B+ tree indexing scheme and another row different from the specific row uses the bitmap indexing scheme. As another example, the monitoring result information may include an indication that a specific partition of the database table uses the B+ tree indexing scheme and another partition different from the specific partition uses the bitmap indexing scheme.

According to an exemplary embodiment of the present disclosure, the monitoring performing unit 203 may perform the monitoring operation based on a predetermined monitoring algorithm. For example, according to a first monitoring algorithm, the monitoring performing unit 203 may generate the monitoring result information by monitoring the count information of access to a column value of a base data structure referred to by the database index structure. In this case, for example, the monitoring result information may include an indication as to which indexing scheme of the first type indexing scheme and the second type indexing scheme is to be used in units of rows. In this case, when the count information of access to the column value is larger than a predetermined access threshold count value, the monitoring result information indicates that the bitmap indexing scheme is to be used and when the count information of access to the column value is equal to or smaller than the predetermined access threshold count value, the monitoring result information may indicate that the B+ tree indexing scheme is to be used.

According to an exemplary embodiment of the present disclosure, the monitoring result information generated by the monitoring performing unit 203 may be generated in units of partition at least partially based on partition characteristic information of the base data structure referred to by the database index structure. For example, the base data structure may include the data table indexed by the database index structure. The partition characteristic information may be decided based on at least one of size information of the distinct value of the partition and the count information of the occurrence of the DML for the partition. For example, when the size information of the distinct value of the partition is smaller than the predetermined size threshold or the count information of the occurrence of the DML for the partition is smaller than the predetermined DML occurrence count threshold value, the monitoring result information may represent that the bitmap indexing scheme is to be used for the partition and when the DML occurrence count information for the partition is equal to or larger than the predetermined DML occurrence count threshold value, the monitoring result information may represent that the B+ tree indexing scheme is to be used for the partition.

According to an exemplary embodiment of the present disclosure, the monitoring result information generated by the monitoring performing unit 203 may be decided at least partially based on the last access time information of the data included in the partition. In this case, when the last access time information of the data included in the partition is older than the predetermined threshold time information, the monitoring result information may represent that the bitmap indexing scheme is to be used for the partition. Further, when the last access time information of the data included in the partition is not older than the predetermined threshold time information, the monitoring result information may represent that the B+ tree indexing scheme is to be used for the partition.

By the monitoring operation of the monitoring performing unit 203, since different types of indexing schemes may be applied for each row and/or for each partition, overall indexing performance may be optimized.

As an example, in the case of the existing bitmap index, when the distinct value is large, the size may become inefficiently larger. Therefore, by the technique according to an exemplary embodiment of the present disclosure, for long tail data in which specific values occupy most of all data and the remaining values are small in number, row pieces that express the data through bitmap indexing are reduced with respect to values with a high access frequency. Furthermore, by using the B+ tree indexing scheme for low frequency values, unnecessary space wastage may be reduced by the technique according to an exemplary embodiment of the present disclosure. That is, by the technique according to an exemplary embodiment of the present disclosure, the size of the index structure may be reduced while an index speed may be increased.

As another example, the B+ tree index is advantageous when the DML occurs frequently and the bitmap index may be advantageous for a Select query or the like. For example, the bitmap index is used for a partition including past data and the B+ tree index is used for a partition including current data in which the update, the insert, and the like occur, and as a result, query response performance may be enhanced through the indexing scheme optimized according to the partition characteristics.

According to an exemplary embodiment of the present disclosure, the monitoring result information generated by the monitoring performing unit 203 may be stored and managed in the storage unit 209. In this case, the query processing unit 205 may retrieve the monitoring result information stored in the storage unit 209 and create the database index structure according to the monitoring result information.

The query processing unit 205 may perform an arbitrary operation for the query. The query processing unit 205 may generate one or more execution algorithms for the query received by the query receiving unit 201. The query processing unit 205 may decide an execution algorithm for executing the query and perform an operation for processing the query according to the decided execution algorithm.

The query processing unit 205 may create the database index structure based on the monitoring result information of the monitoring performing unit 203 when receiving a query related to the index structure definition/creation. The created database index structure may be a form having a plurality of sub index structures hierarchically.

For example, the database index structure may include a sub index structure of a first level and a sub index structure of a second level which is lower than the first level. In this case, the first level sub index structure may correspond to a root node and the second level sub index structure may correspond to the leaf node. Further, the database index structure may include the first level sub index structure, the second level sub index structure which has a level lower than the first level, and a third level sub index structure which has a level lower than the second level. In this case, the first level sub index structure may correspond to the root node, the second level sub index structure may correspond to a branch node, and the third level sub index structure may correspond to the leaf node.

According to an exemplary embodiment of the present disclosure, one or more sub index structures (e.g., root nodes and/or branch nodes) of a plurality of sub index structures may include a start ROWID value of the sub index structure of a lower level thereof and an address value for accessing the sub index structure of the lower level. As a result, a higher node may point a lower node(s), so that a traverse from the higher level to the lower level in the index structure may be made. The processor may verify a condition of each node and perform the operation based on the condition at the time of performing the traverse. The condition may represent whether an index number of a search target is included in a range of the index number included in the node.

According to an exemplary embodiment of the present disclosure, one or more sub index structures (e.g., leaf nodes) of the plurality of sub index structures may include a plurality of columns. A first column among the plurality of columns may include the key values, a second column among the plurality of columns may include the ROWID values corresponding to the row of the data blocks, and a third column among the plurality of columns may include the optimized index values set based on the monitoring result information.

The "optimized index value" according to an exemplary embodiment of the present disclosure may include an indication as to what type of indexing scheme is to be used. For example, based on the optimized index value, it may be determined whether the corresponding column value uses the bitmap index or the B+ tree index. For example, when it is decided to use the B+ tree indexing scheme, the optimized index value may include a NULL value. Further, when it is decided to use the bitmap indexing scheme, the optimized index value may include a corresponding bitmap value. The bitmap indexing may be performed according to the bitmap value. That is, the optimized index value according to an exemplary embodiment of the present disclosure will include the bitmap value for the corresponding row when the monitoring result information indicates that the bitmap type indexing scheme is to be used and the NULL value for the corresponding row when the monitoring result information indicates that the B+ tree type indexing scheme is to be used.

A fourth column among the plurality of columns according to an exemplary embodiment of the present disclosure may include end ROWID values. In this case, the end ROWID values may include the NULL value for the corresponding row when the monitoring result information indicates that the B+ tree indexing scheme is to be used. The end ROWID value may refer to a last ROWID value indicating the ROWID range of the corresponding sub index structure starting from the ROWID value included in the second column. In this case, the bitmap value included in the third column may mean a bit value indicating a relative distance between a reference point and positions of other ROWID values with the ROWID value (i.e., the start ROWID) included in the second column as the reference point.

The communication unit 207 may provide a communication function with another database management apparatus or the client 110. For example, the communication unit 207 may decide to transmit a processing result for the received query to the client 110. Further, the communication unit 207 may control communication with another database management apparatus or the client 110 by using the aforementioned predetermined network and/or database link. In addition, the communication unit 207 may control reception of storing and querying of data and definition/creation, build, and query request of the index, and the like from the client 110. Further, the communication unit 207 may transfer to the client 110 or internal components result information for the storing and querying of the data and build and query request of the index.

The storage unit 209 may store predetermined data stored in relation with execution of a task by the database management apparatus 120. The storage unit 209 may be included in the DBMS 130 and/or the persistent storage medium 140. Additionally, the storage unit 209 may create a table (e.g., index table) and the like on the database management apparatus 120. For example, the creation of the tables may be performed by a separate component such as a control module (not illustrated). Further, the storage unit 209 may process and manage a request related to the storing (including the update) of the data. The storage unit 209 may decide to store the data and the index table. Further, the storage unit 209 may decide a storage location for the data and/or the index table. For example, the storage unit 209 may decide the storage location of the data on the data table. As another example, the storage unit 209 may decide the storage location of the data on the persistent storage medium 140. The storage unit 209 may store the created database index structure. In an additional exemplary embodiment of the present disclosure, the storage unit 209 may include the memory and/or the persistent storage medium 140.

Figure 3:
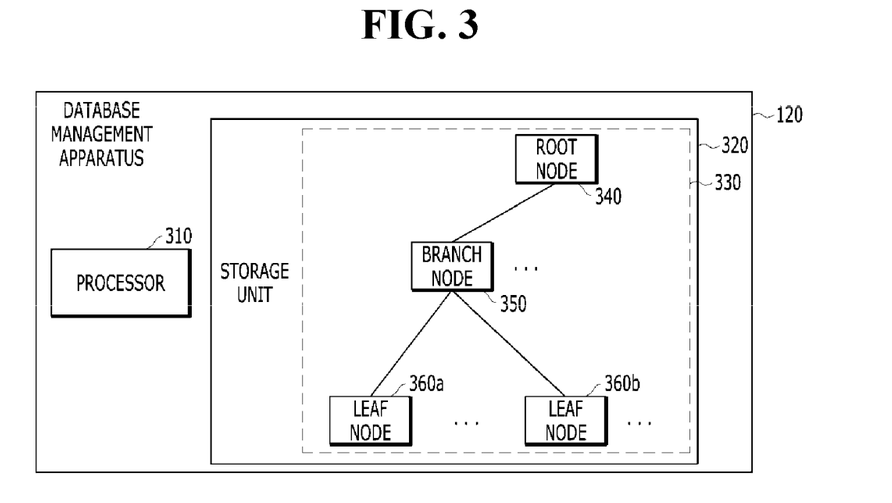
FIG. 3 is a block diagram of a database management apparatus according to an exemplary embodiment of the present disclosure.

FIG. 3 is a block diagram of a database management apparatus according to an exemplary embodiment of the present disclosure.

As illustrated in FIG. 3, the database management apparatus 120 may include a processor 310 and a storage unit 320. The processor 310 may control operations performed by the DBMS 130 described in FIG. 2. The processor 310 may perform the operations described in FIG. 2 by executing the DBMS 130. For example, the processor 310 may perform the monitoring operation and a creation operation of a database index structure 330. As another example, the processor 310 may store the created database index structure 330 in the storage unit 320. Since the operations of the processor 310 correspond to the operations of the DBMS 130 described in FIG. 2, description thereof will be omitted in the description related to FIG. 3.

The storage unit 320 illustrated in FIG. 3 may correspond to the memory and/or persistent storage medium described above. The storage unit 320 may store the database index structure 330. As described in connection with FIG. 2, the database index structure 330 may include one or more sub index structures 340, 350, 360a, and 360b. These sub index structures 340, 350, 360a, and 360b may correspond to a root node 340, a branch node 350, and/or leaf nodes 360a and 360b. The database index structure 330 stored in the storage unit 320 illustrated in FIG. 3 includes only one root node, one branch node, and two leaf nodes, but this is just an example for easy description and a predetermined number and a predetermined type of nodes may form the database index structure 330 without departing from the spirit of the present disclosure.

In an exemplary embodiment of the present disclosure, the root node 340 and the branch node 350 may include the ROWID value of the lower level sub index structure having the lower level thereof and the address value for accessing the lower level sub index structure. For example, when the processor 310 first traverses from the root node 340, the processor 310 may decide the branch node 350 to be traversed based on a branch value (i.e., a value toward which branch node 350 to traverse) to the branch node 350 included in the root node 340 and an address (data block address (DBA) of the branch node 350. The branch node 350 may also decide the leaf node to be traversed among the leaf nodes 360a and 360b in the same manner.

Figure 4:
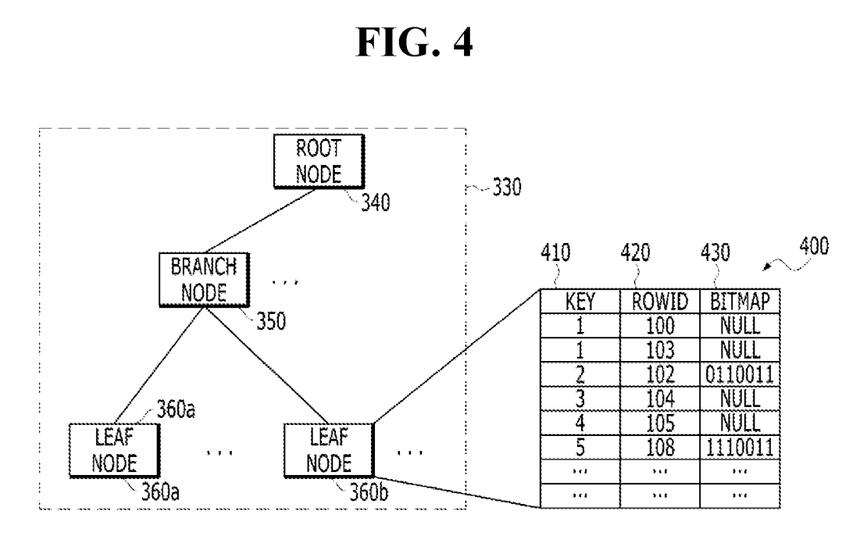
FIG. 4 exemplarily illustrates a database index structure according to an exemplary embodiment of the present disclosure.

FIG. 4 exemplarily illustrates a database index structure according to an exemplary embodiment of the present disclosure.

According to an exemplary embodiment of the present disclosure, an optimal indexing technique may be provided, which combines the bitmap index and the B+ tree index in an efficient manner. The indexing technique may include expressing a leaf node having a low frequency based on a frequency for the leaf node in a B+ tree scheme and expressing a lead node having a high frequency by adding a bitmap value to the B+ tree scheme. Further, the indexing technique may include a technique that expresses the index in the B+ tree scheme with respect to the case where the distinct value is more than a predetermined value or the partition in which the number of occurrence times of the DML is more than a predetermined number of times and expresses the index by adding the bitmap value to the B+ tree scheme with respect to a partition in which the distinct value is smaller than the predetermined number or the occurrence of the DML is small than the predetermined number of times.

As illustrated in FIG. 4, each of the leaf nodes 360a and 360b may have a sub index structure 400. The sub index structure 400 of each of the leaf nodes 360a and 360b may include at least three columns 410, 420, and 430. A first column 410 may include index key values. The index key value may include a column value in a base table, a predetermined hash value for the column value, and/or a predetermined conversion value for the column value. The key values may have unique values or overlapping values in the first column 410. As illustrated in FIG. 4, the first column 410 may have key values of 1, 1, 2, 3, 4, and 5.

A second column 420 may include ROWID values corresponding to the rows of the data block. The ROWID may correspond to a location where actual data is stored. Since the location where the actual data is stored may be retrieved through the ROWID, efficient data retrieval becomes possible as compared with the full scan of the table. According to an exemplary embodiment of the present disclosure, although not illustrated in FIG. 4, a fourth column may be included in the sub index structure 400. The fourth column may contain end ROWID values. In this case, the end ROWID values may include the NULL value for the corresponding row or for the corresponding key value when the monitoring result information represents that the B+ tree indexing scheme is to be used. The end ROWID value may refer to a last ROWID value indicating the ROWID range of the corresponding sub index structure 400 starting from the ROWID value included in the second column 420. In this case, the bitmap value included in the third column 430 may mean a bit value indicating a relative distance between a reference point and positions of other ROWID values with the ROWID value (i.e., the start ROWID) included in the second column 420 as the reference point.

The third column 430 may include optimized index values that are set based on the monitoring result information as described above. That is, the values included in the third column 430 may have the NULL value when the monitoring result information represents that the B+ tree index is used for a specific row or for a specific key value. The values included in the third column 430 may have the bitmap value (i.e., bit value) when the monitoring result information represents that the bitmap index is used for the specific row or for the specific key value.

For example, it is decided that the bitmap indexing scheme is to be used when count information of accessing the column value or count information of accessing the key value is larger than a predetermined access threshold count value (e.g., 1 time per minute or 100 times in total) and it may be decided that the B+ tree indexing scheme is to be used when the count information of accessing the column value or count information of accessing the key value is equal to or smaller than the predetermined access threshold count value.

As illustrated in FIG. 4, a data structure may be provided, which has the key values, the ROWID, and the NULL value with respect to 1, 3, and 4 which are key values having a low data access frequency and a data structure may be provided, which has the key values, the ROWID, and the bitmap value with respect to 2 and 5 which are key values having a high data access frequency. In the example illustrated in FIG. 4, it is illustrated that whether to use the bitmap index or the B+ tree index as the unit of the key values may be decided, but as another example, whether to adopt the bitmap value or the NULL value as the unit of the ROWID may be set according to the monitoring result information.

In an additional exemplary embodiment of the present disclosure, a mapping relationship between the key values or the index structures decided in units of rows and the key values or rows may be stored in a meta table as metadata. By forming the meta table, a more efficient index build may be achieved by checking the mapping relationship stored in the meta table without performing a monitoring process separately every time the index structure is created.

As described above, a sub-index structure (e.g., a data structure of a leaf node) according to an exemplary embodiment of the present disclosure may provide a global index that may use the bitmap index structure and the B+ tree index structure as one index. That is, since the indexing scheme according to the present disclosure uses the bitmap index for data with a high access frequency and the B+ tree index for data with a low access frequency for one index structure, an unnecessary space is reduced, thereby minimizing the size of the index and enhancing even the speed of the index.

Figure 5:
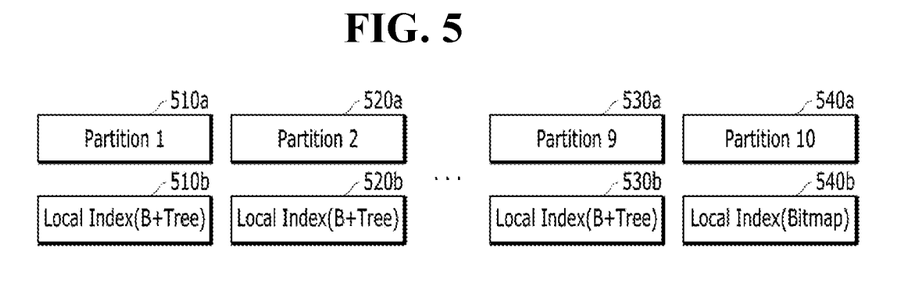
FIG. 5 exemplarily illustrates a database index structure different for each partition according to an exemplary embodiment of the present disclosure.

FIG. 5 exemplarily illustrates a database index structure different for each partition according to an exemplary embodiment of the present disclosure.

As illustrated in FIG. 5, partitions 1 to 10 510*a*, 520*a*, 530*a*, and 540*a*) may have different index structures 510*b*, 520*b*, 530*b*, and 540*b*, respectively, in units of partitions. According to the example in FIG. 5, partitions 1, 2, and 9 510*a*, 520*a*, and 530*a* may have B+ tree indexes 510*b*, 520*b*, and 530*b* as local indexes. Partition 10 540*b* may have a bitmap index 540*b* as the local index.

For example, when the size information of the distinct value of the partition is smaller than a predetermined size threshold value (e.g., 2, 5, 10, 100, or the like) or the DML occurrence count information for the partition is smaller than a predetermined DML occurrence count threshold value (e.g., once per hour or 10 times in total, etc.), it may be decided that the bitmap indexing scheme is to be used for the partition. As an example, a predetermined size threshold value may be preset by the user. As another example, the predetermined size threshold value may be variably and dynamically decided based on the monitoring result information by the monitoring performing unit 203. Further, when DML occurrence count information for a specific partition is equal to or larger than a predetermined DML occurrence count threshold value, it may be decided that the B+ tree indexing scheme is to be used for the partition.

When the last access time information of the data included in the specific partition is older than predetermined threshold time information (e.g., 24 hours, 7 days, 30 days, etc.), it may be decided that the bitmap indexing scheme is to be used for the partition. Further, when the last access time information of the data included in the partition is not older than the predetermined threshold time information, it may be decided that the B+ tree indexing scheme is to be used for the partition.

Since the sub index structure of each partition is the same as the sub index structure 400 described with reference to FIG. 4, the corresponding description thereof will be omitted in FIG. 5.

In an additional exemplary embodiment of the present disclosure, the mapping relationship between the partitions 510*a*, 520*a*, 530*a*, and 540*a* and the index structures 510*b*, 520*b*, 530*b*, and 540*b* decided in units of partitions may be stored in the meta table as the metadata. By forming the meta table, the more efficient index build may be achieved by checking the mapping relationship stored in the meta table without performing the monitoring process separately every time the index structure is created.

By an indexing partitioning scheme in units of partitions according to an exemplary embodiment of the present disclosure, a local index capable of using the bitmap index structure or the B+ tree index structure may be provided for each partition according to the characteristics of the partition. That is, the bitmap index is used for a partition where the distinct value of the partition is small or DML rarely occurs and the B+ tree index is used for a partition where the DML frequently occurs, and as a result, efficient space management becomes possible and query performance may be enhanced.

Figure 6:
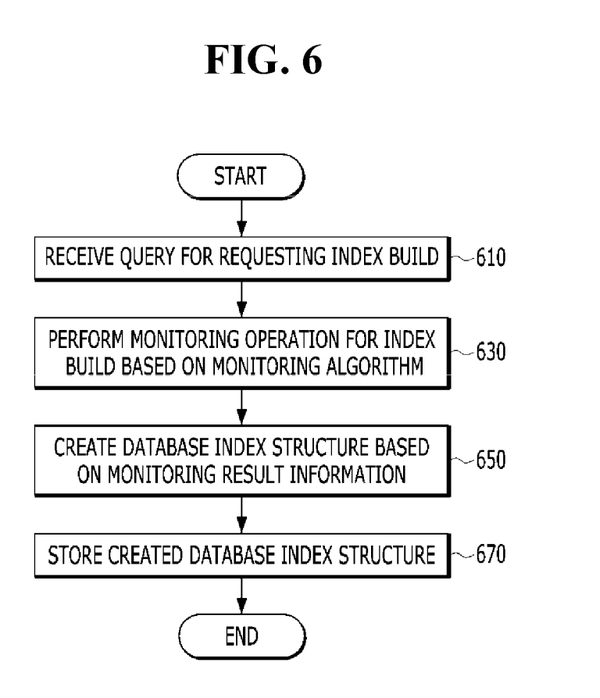
FIG. 6 exemplarily illustrates a flowchart for performing efficient indexing according to an exemplary embodiment of the present disclosure.

FIG. 6 exemplarily illustrates a flowchart for performing efficient indexing according to an exemplary embodiment of the present disclosure. Steps illustrated in FIG. 6 may be performed, for example, by the database management apparatus 120. Further, the steps illustrated in FIG. 6 may be performed, for example, by one or more processors 310. The steps illustrated in FIG. 6 are just exemplary and additional steps may be present or some of the illustrated steps may be omitted.

As illustrated in FIG. 6, the database management apparatus 120 may receive a query for requesting the index build issued from the user (610). For example, the query for requesting the index build may include an indication that an index type data structure is to be created to facilitate retrieval of the created data table structure.

In response to requesting the index build, the database management apparatus 120 may perform the monitoring operation for the index build based on a predetermined monitoring algorithm (630). As a result of the monitoring operation, the monitoring result information may be generated. A predetermined type database monitoring scheme may be used to perform the monitoring operation. The monitoring operation in the present specification may mean a predetermined type process of acquiring at least one information of, for building the index, count/frequency information of access to a specific key value, count/frequency information of access to specific data, distinct value information for a specific partition, count/frequency information of occurrence of the DML for the specific partition, and last access time information of data included in the specific partition. For example, the count/frequency information may mean a counting value or may be a count value per hour, but these are merely illustrative and may be included in the monitoring result information when the counting value and the count value per hour are comparable type information.

The database management apparatus 120 may create the database index structure based on the monitoring result information generated by the monitoring operation (630). The database index structure may be variably set according to the indication included in the monitoring result information. Further, the database management apparatus 120 may link the created database index structure and the base data table to each other. Since a detailed description of the database index structure has been previously described with reference to FIGS. 2 to 5, the detailed description of the database index structure will be omitted from the description of FIG. 6.

The database management apparatus 120 may store the created database index structure in a predetermined type storage unit (650). The storage unit may include momentary/temporary storage media and/or persistent storage media. For example, the database management apparatus 120 may store the created database index structure in the buffer cache (650). In this case, the database index structure stored in the buffer cache by a background process at a predetermined period or by user setting may be recorded in the permanent storage medium. In addition, the created database index structure may be stored in a separate storage server and the separate storage server may collect predetermined types of stored data in groups and record the data in the persistent storage medium.

Figure 7:
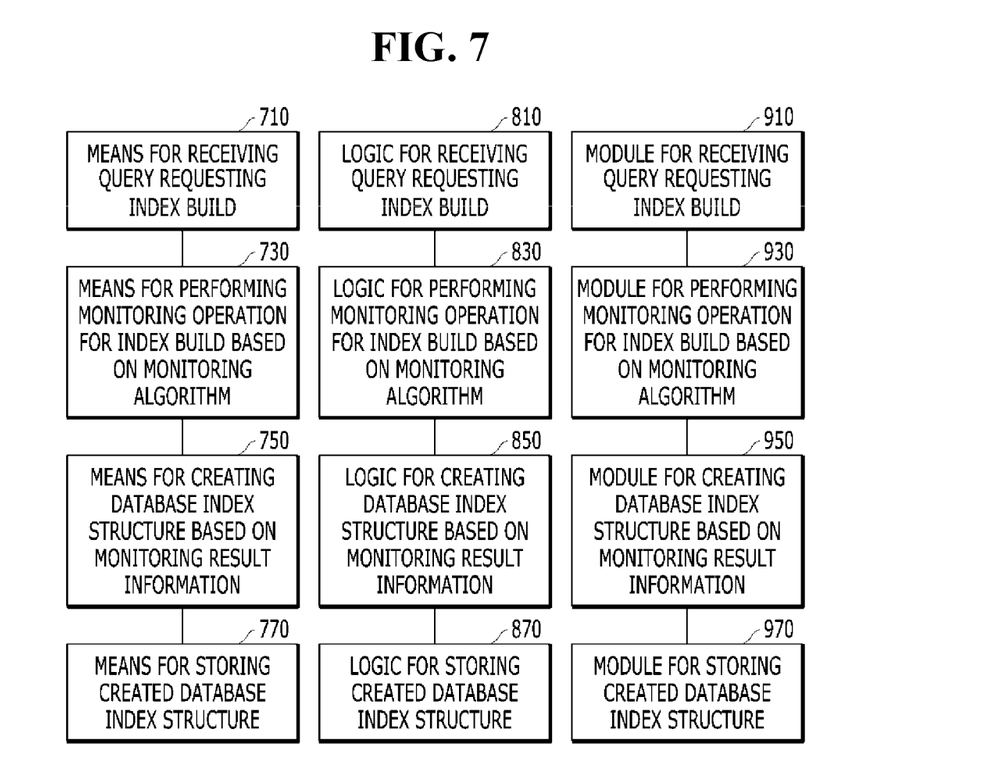
FIG. 7 exemplarily illustrates a means, a logic, and a module for performing efficient indexing according to an exemplary embodiment of the present disclosure.

FIG. 7 illustrates various exemplary logic blocks, components, modules, means, and logics, and algorithm steps according to an exemplary embodiment of the present disclosure.

Those skilled in the art needs to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

The means, logic, and module illustrated in FIG. 7 may correspond to the steps described in FIG. 6, respectively.

As illustrated in FIG. 7, the database management apparatus 120 may include a means 710 for receiving a query requesting an index build, a means 730 for performing a monitoring operation for the index build based on a monitoring algorithm, a means 750 for creating a database index structure based on monitoring result information, and a means 770 for storing the created database index structure.

The database management apparatus 120 may include a logic 810 for receiving a query requesting an index build, a logic 830 for performing a monitoring operation for the index build based on a monitoring algorithm, a logic 850 for creating a database index structure based on monitoring result information, and a logic 870 for storing the created database index structure.

In addition, the database management apparatus 120 may include a module 910 for receiving a query requesting an index build, a module 930 for performing a monitoring operation for the index build based on a monitoring algorithm, a module 950 for creating a database index structure based on monitoring result information, and a module 970 for storing the created database index structure.

Figure 8:
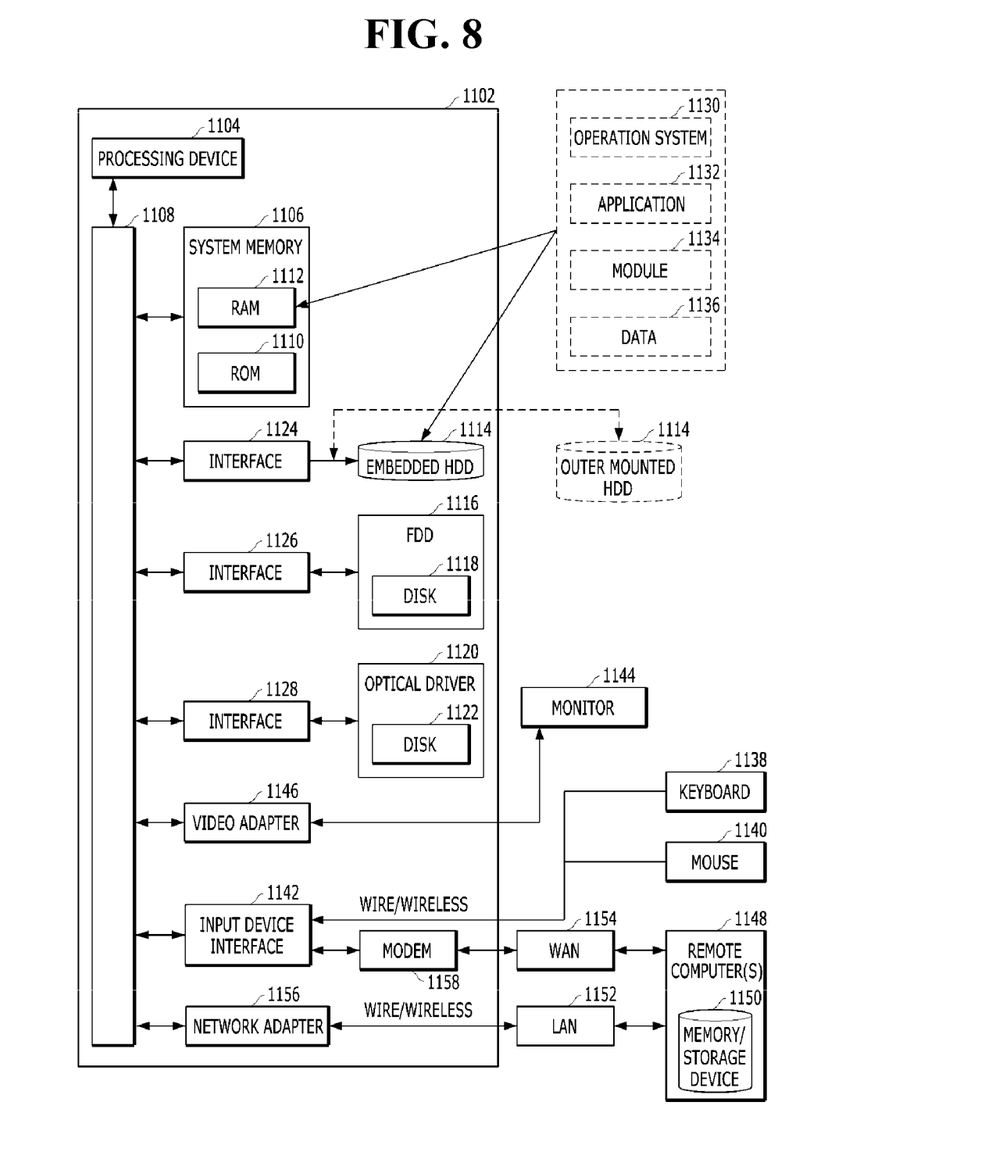
FIG. 8 illustrates a simple and general schematic view of an exemplary computing environment in which the exemplary embodiments of the present disclosure may be implemented.

FIG. 8 illustrates a simple and general schematic view of an exemplary computing environment in which the exemplary embodiments of the present disclosure may be implemented.

The present disclosure has generally been described above in association with a computer executable command or logic which may be executed on one or more database management apparatuses, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method and the operation of the present disclosure can be implemented by other computer system configurations including a personal computer, a handheld computing device, microprocessor-based or programmable home appliances, and others (the respective apparatuses may operate in connection with one or more associated apparatuses (e.g., database management apparatus 120) as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer (e.g., database management apparatus 120) generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary or non-temporary media, and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media.

An exemplary environment 1100 that implements various aspects of the present disclosure including a computer 1102 is shown and the computer 1102 includes a processing device (or processor) 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include a wireless channel and various other media that can store, possess, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

What is claimed is:

1. A computer program stored in a non-transitory computer readable storage medium including encoded commands, which is configured to cause one or more processors to perform operations in order to enhance retrieval performance of data when the computer program is executed by the one or more processors of a computer system, wherein the operations include:
    an operation of creating a database index structure for pointing a data storage location based on monitoring result information depending on a monitoring algorithm, which is generated at least partially based on count information of access to a column value of a base data structure referred to by the database index structure and includes an indication as to which indexing scheme of a first type and a second type is to be used in units of row or in units of key value, in a database management system (DBMS),
    wherein the database index structure at least partially includes a sub index structure of a first level, which includes at least one of a root node and a branch node, and a sub index structure of a second level which is lower than the first level, which includes a leaf node,
    the first level sub index structure includes a start ROWID value of a sub index structure of a lower level and an address value for accessing the lower level sub index structure,
    the second level sub index structure includes a plurality of columns and an indication representing which indexing scheme of the first type and the second type, different from the first type indexing scheme, is to be used by the second level sub index structure,
    a first column among the plurality of columns of the second level sub index structure includes key values,
    a second column among the plurality of columns of the second level sub index structure includes ROWID values corresponding to rows of a data block, and
    a third column among the plurality of columns of the second level sub index structure includes a bitmap value, which is a bit value indicating a relative distance between a reference point and locations of other ROWID values in the second level sub index structure, wherein the reference point is a ROWID value, when the monitoring result information represents that the first type indexing scheme is to be used, and includes a NULL value when the monitoring result information represents that the second type indexing scheme is to be used.

2. The computer program stored in the non-transitory computer readable storage medium of claim 1, wherein a fourth column among the plurality of columns of the second level sub index structure includes end ROWID value and the end ROWID value includes the NULL value when the monitoring result information represents that the second type indexing scheme is to be used.

3. The computer program stored in the non-transitory computer readable storage medium of claim 1, wherein when the count information of the access to the column value or the count information of the access to the key value is larger than a predetermined access threshold count value, the monitoring result information represents that the first type indexing scheme is to be used, and
    when the count information of the access to the column value or the count information of the access to the key value is equal to or smaller than the predetermined access threshold count value, the monitoring result information represents that the second type indexing scheme is to be used.

4. The computer program stored in the non-transitory computer readable storage medium of claim 1, wherein the monitoring result information depending on the monitoring algorithm is generated in units of partition at least partially based on partition characteristic information of the base data structure referred to by the database index structure.

5. The computer program stored in the non-transitory computer readable storage medium of claim 1, wherein the partition characteristic information of the base data structure is determined based on at least one of size information of a distinct value of the partition and count information of occurrence of a data manipulation language (DML) for the partition.

6. The computer program stored in the non-transitory computer readable storage medium of claim 5, wherein when the size information of the distinct value of the partition is smaller than a predetermined size threshold value or the DML occurrence count information for the partition is smaller than a predetermined DML occurrence count threshold value, the monitoring result information represents that the first type indexing scheme is to be used for the partition, and
    when the DML occurrence count information for the partition is equal to or larger than the predetermined DML occurrence count threshold value, the monitoring result information represents that the second type indexing scheme is to be used for the partition.

7. The computer program stored in the non-transitory computer readable storage medium of claim 1, wherein the monitoring result information depending on the monitoring algorithm is determined at least partially based on last access time information of data included in the partition, and
    when the last access time information of the data included in the partition is older than predetermined threshold time information, the monitoring result information represents that the first type indexing scheme is to be used for the partition, and
    when the last access time information of the data included in the partition is not older than the predetermined threshold time information, the monitoring result information represents that the second type indexing scheme is to be used for the partition.

8. A method performed by a database management system (DBMS), the method comprising:
    creating a database index structure for pointing a data storage location based on monitoring result information depending on a monitoring algorithm, which is generated at least partially based on count information of access to a column value of a base data structure referred to by the database index structure and includes an indication as to which indexing scheme of a first type and a second type is to be used in units of row or in units of key value, in the database management system, wherein the database index structure at least partially includes a sub index structure of a first level, which includes at least one of a root node and a branch node, and a sub index structure of a second level which is lower than the first level, which includes a leaf node, the first level sub index structure includes a start ROWID value of a sub index structure of a lower level and an address value for accessing the lower level sub index structure, the second level sub index structure includes a plurality of columns and an indication representing which indexing scheme of the first type and the second type, different from the first type indexing scheme, is to be used by the second level sub index structure, a first column among the plurality of columns of the second level sub index structure includes key values, a second column among the plurality of columns of the second level sub index structure includes ROWID values corresponding to rows of a data block, and a third column among the plurality of columns of the second level sub index structure includes a bitmap value, which is a bit value indicating a relative distance between a reference point and locations of other ROWID values in the second level sub index structure, wherein the reference point is a ROWID value, when the monitoring result information represents that the first type indexing scheme is to be used, and includes a NULL value when the monitoring result information represents that the second type indexing scheme is to be used.

9. A database management apparatus comprising:

a processor configured to create a database index structure for pointing a data storage location based on monitoring result information depending on a monitoring algorithm, which is generated at least partially based on count information of access to a column value of a base data structure referred to by the database index structure and includes an indication as to which indexing scheme of a first type and a second type is to be used in units of row or in units of key value, in the database management system; and a storage unit configured to store the database index structure, wherein the database index structure at least partially includes a sub index structure of a first level, which includes at least one of a root node and a branch node, and a sub index structure of a second level which is lower than the first level, which includes a leaf node, the first level sub index structure includes a start ROWID value of a sub index structure of a lower level and an address value for accessing the lower level sub index structure, the second level sub index structure includes a plurality of columns and an indication representing which indexing scheme of the first type and the second type, different from the first type indexing scheme, is to be used by the second level sub index structure, a first column among the plurality of columns of the second level sub index structure includes key values, a second column among the plurality of columns of the second level sub index structure includes ROWID values corresponding to rows of a data block, and a third column among the plurality of columns of the second level sub index structure includes a bitmap value, which is a bit value indicating a relative distance between a reference point and locations of other ROWID values in the second level sub index structure, wherein the reference point is a ROWID value, when the monitoring result information represents that the first type indexing scheme is to be used, and includes a NULL value when the monitoring result information represents that the second type indexing scheme is to be used.

* * * * *